(12) United States Patent
Coffin et al.

(10) Patent No.: US 11,613,963 B2
(45) Date of Patent: Mar. 28, 2023

(54) FLOW CONTROL SYSTEM FOR A NON-NEWTONIAN FLUID IN A SUBTERRANEAN WELL

(71) Applicant: Halliburton Energy Services, Inc., Houston, TX (US)

(72) Inventors: Maxime P M Coffin, Frisco, TX (US); Michael Linley Fripp, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 398 days.

(21) Appl. No.: 16/070,198

(22) PCT Filed: Jul. 24, 2017

(86) PCT No.: PCT/US2017/043513
§ 371 (c)(1),
(2) Date: Jul. 13, 2018

(87) PCT Pub. No.: WO2019/022705
PCT Pub. Date: Jan. 31, 2019

(65) Prior Publication Data
US 2019/0264542 A1    Aug. 29, 2019

(51) Int. Cl.
| E21B 34/10 | (2006.01) |
| C09K 8/508 | (2006.01) |
| C09K 8/68 | (2006.01) |
| C09K 8/72 | (2006.01) |
| C09K 8/88 | (2006.01) |
| E21B 43/16 | (2006.01) |
| E21B 43/14 | (2006.01) |

(52) U.S. Cl.
CPC .............. *E21B 34/10* (2013.01); *C09K 8/508* (2013.01); *C09K 8/68* (2013.01); *C09K 8/725* (2013.01); *C09K 8/88* (2013.01); *E21B 43/16* (2013.01); *E21B 43/14* (2013.01)

(58) Field of Classification Search
CPC .......... E21B 41/00; E21B 21/08; E21B 43/16; E21B 43/14
See application file for complete search history.

(56) References Cited

U.S. PATENT DOCUMENTS

| 5,865,247 A | 2/1999 | Paterson et al. |
| 8,291,976 B2 | 10/2012 | Schultz et al. |

(Continued)

FOREIGN PATENT DOCUMENTS

WO    2015009314 A1    1/2015

OTHER PUBLICATIONS

International Search Report and the Written Opinion for International Application No. PCT/US2017/043513 dated Apr. 24, 2018, 12 pages.

(Continued)

*Primary Examiner* — Caroline N Butcher
*Assistant Examiner* — Neel Girish Patel
(74) *Attorney, Agent, or Firm* — K&L Gates LLP

(57) ABSTRACT

A method of pumping a non-Newtonian fluid includes pumping the non-Newtonian fluid into an interior of a tubular string, and autonomously controlling a flow resistance to the non-Newtonian fluid flowing from the interior of the tubular string to an exterior of the tubular string with an autonomous flow control device.

12 Claims, 7 Drawing Sheets

(56) References Cited

U.S. PATENT DOCUMENTS

| | | |
|---|---|---|
| 8,584,762 B2 | 11/2013 | Fripp et al. |
| 8,714,266 B2 | 5/2014 | Dykstra et al. |
| 9,145,766 B2 | 9/2015 | Fripp et al. |
| 9,249,649 B2 | 2/2016 | Fripp et al. |
| 2009/0114391 A1 | 5/2009 | Smith et al. |
| 2011/0011590 A1* | 1/2011 | Mathiesen ............ E21B 43/162 166/305.1 |
| 2011/0056578 A1* | 3/2011 | Mathiesen ............ F16K 15/02 138/46 |
| 2012/0031625 A1* | 2/2012 | Mathiesen ............ E21B 43/12 166/373 |
| 2012/0211243 A1* | 8/2012 | Dykstra ................ E21B 34/06 166/373 |
| 2012/0255740 A1* | 10/2012 | Fripp .................... E21B 43/14 166/373 |
| 2014/0041731 A1* | 2/2014 | Fripp .................... E21B 43/32 137/13 |
| 2014/0216733 A1 | 8/2014 | Mathiesen et al. |
| 2016/0032694 A1* | 2/2016 | Least .................... E21B 43/12 166/227 |
| 2016/0201425 A1* | 7/2016 | Walton ................ E21B 33/1208 166/376 |
| 2016/0258264 A1* | 9/2016 | Lesko .................... E21B 43/26 |
| 2017/0030173 A1* | 2/2017 | MacPhail ................ E21B 43/12 |

OTHER PUBLICATIONS

Bouts et al. "Design of Horizontal Polymer Injectors Requiring Conformance and Sand Control," SPE 169722-MS, presented at the SPE EOR Conference at Oil and Gas West Asia held in Muscat, Oman, Mar. 31-Apr. 2, 2014, 9 pages.

Brakstad et al. "Modelling Viscosity and Mechanical Degradation of Polyacrylamide Solutions in Porous Media," SPE-179593-MS, presented at the SPE Improved Oil Recovery Conference held in Tulsa, Oklahoma, USA, Apr. 11-13, 2016, 35 pages.

* cited by examiner

FLOW CONTROL SYSTEM FOR A NON-NEWTONIAN FLUID IN A SUBTERRANEAN WELL

BACKGROUND

This section is intended to provide relevant contextual information to facilitate a better understanding of the various aspects of the described embodiments. Accordingly, it should be understood that these statements are to be read in this light and not as admissions of prior art.

This disclosure relates generally to equipment utilized and operations performed in conjunction with a subterranean well and, in an example described below, more particularly provides for the use of one or more autonomous flow control devices.

In a hydrocarbon well, it may be beneficial to regulate the flow of fluids from the surface into the wellbore, from the wellbore in an earth formation, and within the wellbore altogether. A variety of purposes may be served by such regulation, such as when injecting fluids into the subterranean formation for purposes of stimulating the well.

Therefore, it will be appreciated that advancements in the art of autonomously controlling the flow of fluid in a well, particularly with non-Newtonian fluids, would be desirable in the circumstances mentioned above, and such advancements would also be beneficial in a wide variety of other circumstances.

BRIEF DESCRIPTION OF THE DRAWINGS

Illustrative embodiments of the present disclosure are described in detail below with reference to the attached drawing figures, which are incorporated by reference herein and wherein.

The illustrated figures are only exemplary and are not intended to assert or imply any limitation with regard to the environment, architecture, design, or process in which different embodiments may be implemented.

DETAILED DESCRIPTION OF ILLUSTRATIVE EMBODIMENTS

Oil and gas hydrocarbons are naturally occurring in some subterranean formations. A subterranean formation containing oil or gas may be referred to as a reservoir, in which a reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir.

A well can include, without limitation, an oil, gas, or water production well, or an injection well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

Figure 1:
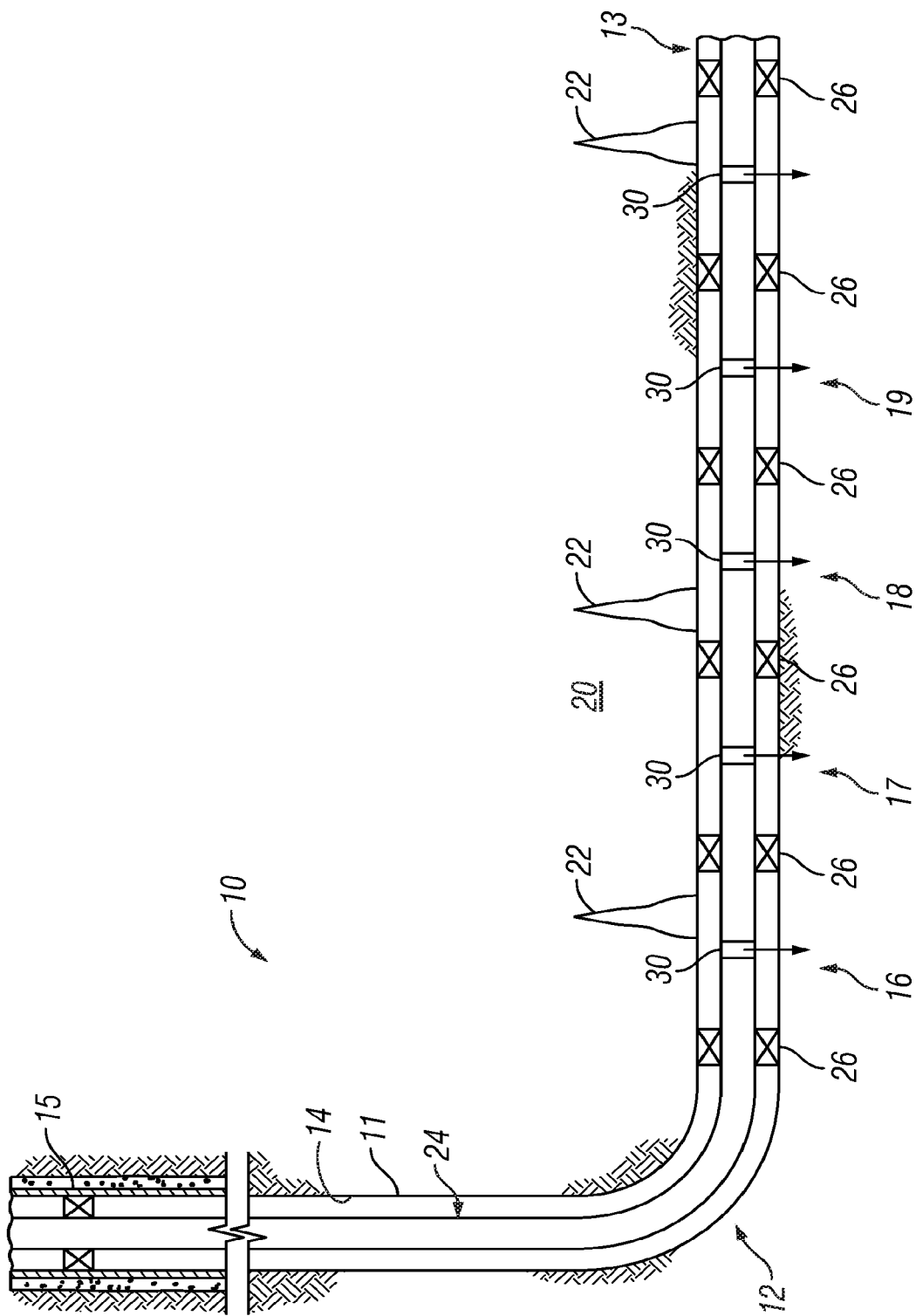
FIG. 1 shows a schematic view a well system including multiple autonomous flow control devices located within multiple zones of the well system in accordance with the present disclosure.

Turning to the Figures, FIG. 1 depicts a well system 10 containing multiple autonomous flow control devices 30 (e.g., outflow control devices) located within multiple zones of the well system 10. The well system 10 includes at least one wellbore 11 that penetrates and is formed within a subterranean formation 20. The subterranean formation 20 can be a portion of a reservoir or adjacent to a reservoir. The wellbore 11 is shown as having a generally vertical uncased section 14 extending downwardly from a casing 15, as well as a generally horizontal uncased section extending through the subterranean formation 20. The wellbore 11 may include generally vertical wellbore sections and/or generally horizontal wellbore sections. In this embodiment, the wellbore 11 includes a heel 12 positioned generally at the intersection of the vertical and horizontal wellbore sections, and a toe 13 positioned generally at an end of the horizontal wellbore section.

A tubing string 24 (such as an injection or stimulation tubing string or coiled tubing) is installed in the wellbore 11 and includes the autonomous flow control devices 30. The well system 10 is shown as including multiple zones 16-19, in which the present disclosure may relate to pumping and injecting fluid, and more particularly a non-Newtonian fluid, into one or more of the zones 16-19 simultaneously. The zones may be isolated from one another in a variety of ways known to those skilled in the art. For example, the zones can be isolated via multiple packers 26. The packers 26 can seal off an annulus located between the outside of the tubing string 24 and the wall of wellbore 11. However, the present disclosure is not so limited, as potentially no packers or other components or structures may be used to isolate the zones from each other.

A flow control device can be used to variably control, restrict, or adjust the flow rate of a fluid. A flow control device can also be used to deliver a relatively constant flow rate of a fluid. For example, a flow control device can be positioned in a wellbore at a location within a particular zone to regulate the flow rate of the fluid in that zone. Further, the autonomous flow control devices 30 may be used to autonomously control the flow rate of fluid flow through the devices 30. In particular, as the autonomous flow control devices 30 are autonomous, the devices 30 are designed to automatically adjust the flow rate of the fluid exiting the device 30 based on a change in at least one property of the fluid (e.g., viscosity) without any external intervention (e.g., interaction with the surface or another component downhole). Viscosity is an example of a physical property of a fluid. The viscosity of a fluid is the dissipative behavior of fluid flow and includes, but is not limited to, kinematic viscosity, shear strength, yield strength, surface tension, viscoplasticity, and thixotropicity. Viscosity is commonly expressed in units of centipoise (cP), which is 1/100 poise. One poise is equivalent to the units of dyne-sec/cm². Velocity is another example of a physical property of a fluid that may be used to automatically adjust the flow rate of the fluid exiting the device 30.

The fluid pumped within the system 10 is or includes a non-Newtonian fluid. A non-Newtonian fluid is a fluid that does not follow Newton's Law of Viscosity. In particular, the viscosity (the measure of a fluid's ability to resist gradual deformation by shear or tensile stresses) of non-Newtonian fluids is dependent on shear rate or shear rate history. For example, the viscosity of a non-Newtonian fluid decreases as fluid shear, or flow rate of the fluid, increases. The non-Newtonian fluid may, for example, include a synthetic polymer or a biopolymer. The synthetic polymer may include a polyacrylamide, or a cellulose or xanthan-based polymer. In one embodiment, the non-Newtonian fluid may include a gel, such as an injection gel, an acid gel, a gravel pack gel, and/or a sealing gel. Accordingly, the non-Newtonian fluid may be a stimulation fluid, a fracturing fluid, an acidizing fluid, and/or a sealing fluid.

As shown, the first autonomous flow control device 30 is located adjacent to the first zone 16 and the second autonomous flow control device 30 is located adjacent to the second zone 17. If more than two autonomous flow control devices 30 are used, then a third autonomous flow control device 30 can be located adjacent to the third zone 18, the fourth autonomous flow control device 30 can be located adjacent to the fourth zone 19, and so long. The present disclosure may include the step of pumping or flowing a non-Newtonian fluid through one or more of the autonomous flow control devices 30. Moreover, more than one autonomous flow control device 30 may also be located adjacent to a particular zone, for example, located within adjacent pairs of packers 26 forming the first zone.

It should be noted that the well system 10 is illustrated in the drawings and is described herein as merely one example of a wide variety of well systems in which the principles of this disclosure can be utilized. It should be clearly understood that the principles of this disclosure are not limited to any of the details of the well system 10, or components thereof, depicted in the drawings or described herein. Furthermore, the well system 10 can include other components not depicted in the drawing. For example, the well system 10 can further include a well screen. The autonomous flow control device 30 can be positioned adjacent to the well screen. By way of another example, cement may be used instead of packers 26 to isolate different zones. Cement may also be used in addition to packers 26.

The well system 10 does not need to include a packer 26. Also, it is not necessary for one well screen and one autonomous flow control device 30 to be positioned between each adjacent pair of the packers 26. It is also not necessary for a single autonomous flow control device 30 to be used in conjunction with a single well screen. Any number, arrangement and/or combination of these components may be used.

In one or more embodiments, the present disclosure relates to injecting a non-Newtonian fluid into one or more of the zones 16-19 of the subterranean formation 20. FIG. 1 depicts a fracture 22. The non-Newtonian fluid may be pumped through the tubing string 24 and into the fracture 22, such as to treat, create, or extend the fracture 22. In yet another embodiment, the non-Newtonian fluid may be used to sweep oil from an injection wellbore towards a production wellbore.

The autonomous flow control device 30 can be included within the tubing string 24 in a manner such that a fluid inlet into the autonomous flow control device 30 is functionally oriented towards the interior of the tubing string 24. Therefore, the non-Newtonian fluid can flow from the interior of the tubing string 24, through the autonomous flow control device 30, and out to the exterior of the tubing string 24 in the annulus between the tubing string 24 and the wellbore 11. For example, in an embodiment in which a well screen is included with the tubing string 24, the autonomous flow control device 30 may be positioned in the fluid flow path between the inner diameter or interior of the tubing string 24 and the well screen. Once exterior to the autonomous flow control device 30, the non-Newtonian fluid can perform a variety of functions, such as flowing into the formation 20 in order to stimulate the formation at the desired zones.

Various examples of an autonomous flow control device 30 in accordance with the present disclosure are discussed more below, but an autonomous flow control device 30 may include, for example, a fluidic diode autonomous flow control device, a movable plate autonomous flow control device, a differential pressure autonomous flow control device, and a labyrinth-shaped autonomous flow control device. The autonomous flow control device 30 may be incorporated into the tubing string 24 through a variety of installations. For example, the device 30 may be positioned or formed within a wall of the tubing string 24, may be welded to the tubing string 24, may be threaded to the tubing string 24, and/or may be otherwise mechanically coupled to the tubing string 24. These examples for the autonomous flow control device 30 are not the only examples that could be given, and thus are not intended to limit the scope of the present disclosure.

Figure 2:
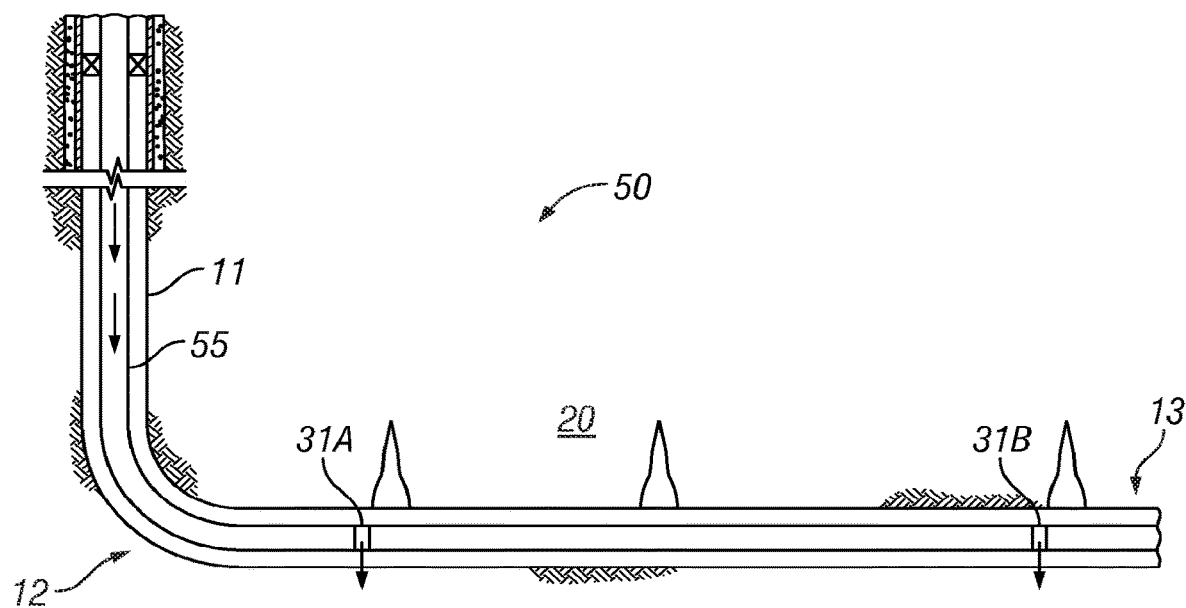
FIG. 2 shows a schematic view a well system including multiple non-autonomous flow control devices located.
Figure 3:
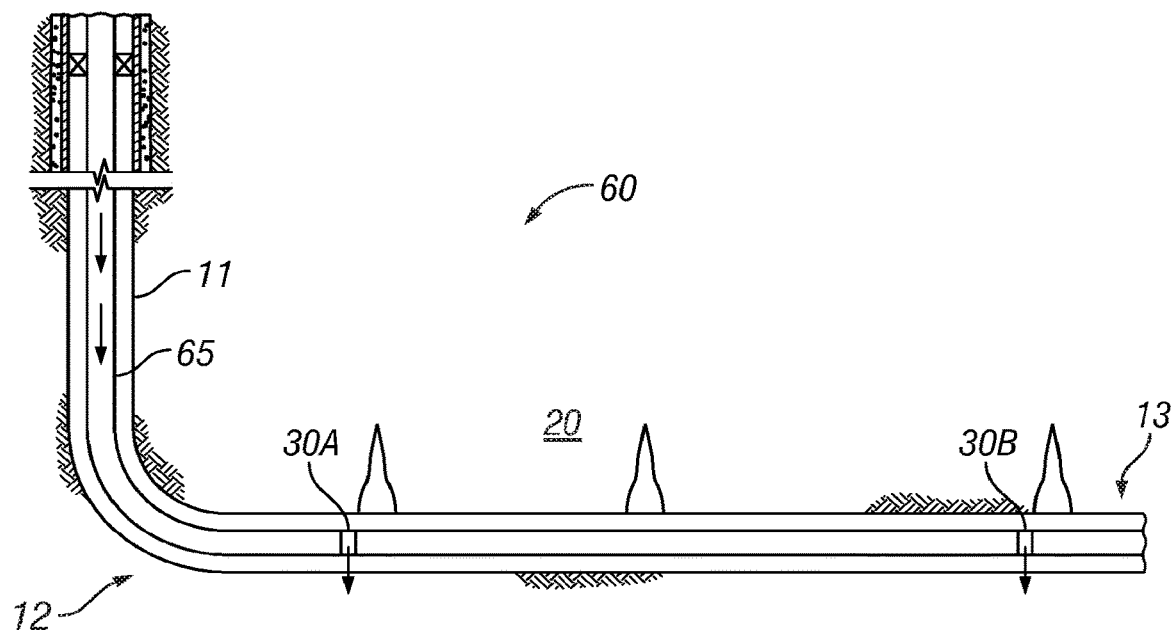
FIG. 3 shows a schematic view a well system including multiple autonomous flow control devices located in accordance with the present disclosure.

Referring now to FIGS. 2 and 3, multiple schematic views are shown of well systems that include non-autonomous flow control devices 31 and autonomous flow control devices 30. In particular, FIG. 2 shows a well system 50 that provides an upstream non-autonomous flow control device 31A and a downstream non-autonomous flow control device 31B included within a tubular string 55. FIG. 3 shows a well system 60 that provides an upstream autonomous flow control device 30A and a downstream autonomous flow control device 30B included within a tubular string 65. In these examples, the well systems 50 and 60 are positioned within the same formation. Therefore, the properties and characteristics for the formation will be consistent for both the non-autonomous flow control system 50 and the autonomous flow control system 60 for purposes of comparison. Further, though not shown and as discussed above, one or more packers may be included within the well systems 50 and 60.

In one example, a Newtonian fluid, such as water, is pumped into the interior of the tubular string 55 in FIG. 2, in which the non-autonomous flow control devices 31A and 31B are used to control the flow rate of the Newtonian fluid flowing from the interior of the tubular string 55 to the exterior of the tubular string 55, such as into the annulus formed between the string 55 and the wellbore 11. The non-autonomous flow control devices 31 may each be set to have the same or similar flow resistance to the Newtonian fluid flowing therethrough. However, in this example, due to variations and inconsistencies in the permeability of the formation, the formation proximate the flow device 31A has greater permeability than the formation proximate flow device 31B. Similarly, in FIG. 3 and the other below discussed examples, the formation will have the same properties such that the formation proximate the flow device 30A has greater permeability than the formation proximate the flow device 30B.

In such an example with respect to FIG. 2, a greater fraction of the fluid is expected to flow through flow device 31A. For instance, about 60% of the Newtonian fluid may expect to flow out through the upstream non-autonomous flow control device 31A, and the remaining 40% of the Newtonian fluid may expect to flow out through the downstream non-autonomous flow control device 31B. Accordingly, if a flow rate of 10 gal/min (37.9 lit/min) of Newtonian fluid is pumped into the tubular string 55, a flow rate of about 6 gal/min (22.7 lit/min) of Newtonian fluid may expect to flow through the upstream non-autonomous flow control device 31A, and a flow rate of about 4 gal/min (15.1 lit/min) of Newtonian fluid may expect to flow through the downstream non-autonomous flow control device 31B.

In another example for comparison, a non-Newtonian fluid is pumped into the interior of the tubular string 55 in FIG. 2, in which the non-autonomous flow control devices 31A and 31B are used to control the flow rate of the non-Newtonian fluid flowing from the interior of the tubular string 55 to the exterior of the tubular string 55. The non-autonomous flow control devices 31A and 31B are each set to have the same or similar flow resistance to the non-Newtonian fluid flowing therethrough, and the formation has the same permeability variation as the previous example. In such an example with a non-Newtonian fluid, a greater percentage of the non-Newtonian fluid will travel through flow control device 31A. For instance, about 75% of the non-Newtonian fluid may expect to flow out through the upstream non-autonomous flow control device 31A, and the remaining 25% of the non-Newtonian fluid may expect to flow out through the downstream non-autonomous flow control device 31B. Accordingly, if a flow rate of 10 gal/min (37.9 lit/min) of non-Newtonian fluid is pumped into the tubular string 55, a flow rate of about 7.5 gal/min (28.4 lit/min) of non-Newtonian fluid may expect to flow through the upstream non-autonomous flow control device 31A, and a flow rate of about 2.5 gal/min (9.5 lit/min) of non-Newtonian fluid may expect to flow through the downstream non-autonomous flow control device 31B. In such an embodiment, the non-autonomous flow control devices 31A and 31B are shown as having a 3:1 imbalanced ratio for controlling the flow rate of a non-Newtonian fluid, as compared to a 3:2 more balanced ratio for controlling the flow rate of a Newtonian fluid.

In another example, a Newtonian fluid, such as water, is pumped into the interior of the tubular string 65 in FIG. 3, in which the autonomous flow control devices 30A and 30B are used to control the flow rate of the Newtonian fluid flowing from the interior of the tubular string 65 to the exterior of the tubular string 65, such as into the annulus formed between the string 65 and the wellbore 11. As mentioned above, the autonomous flow control devices 30A and 30B are autonomous, and therefore autonomously control the flow rate of fluid flow through the devices 30A and 30B. Further, the formation has the same properties and the same permeability variation as the formation as the previous examples. In such an example, the results may be similar to those in FIG. 2 with Newtonian fluid, in which about 60% of the Newtonian fluid may expect to flow out through the upstream autonomous flow control device 30A, and the remaining 40% of the Newtonian fluid may expect to flow out through the downstream autonomous flow control device 30B. Accordingly, if a flow rate of 10 gal/min (37.9 lit/min) of Newtonian fluid is pumped into the tubular string 65, a flow rate of about 6 gal/min (22.7 lit/min) of Newtonian fluid may expect to flow through the upstream autonomous flow control device 30A, and a flow rate of about 4 gal/min (15.1 lit/min) of Newtonian fluid may expect to flow through the downstream autonomous flow control device 30B.

In yet another example, a non-Newtonian fluid is pumped into the interior of the tubular string 65 in FIG. 3, in which the autonomous flow control devices 30 are used to control the flow rate of the non-Newtonian fluid flowing from the interior of the tubular string 65 to the exterior of the tubular string 65. Further, the formation has the same properties and the same permeability variation as the formation as the previous examples. As discussed above, a viscosity (e.g., apparent viscosity) of a non-Newtonian fluid may decrease as fluid shear, or flow rate of the non-Newtonian fluid, increases. In particular, for the non-Newtonian fluid, the apparent viscosity of the fluid changes with the velocity or flow rate of the fluid. Further, the autonomous flow control devices 30 are designed to automatically adjust the flow rate of the fluid exiting the device 30 based on a change in at least one property of the fluid (e.g., apparent viscosity) without any external intervention (e.g., interaction with the surface or another component downhole). Accordingly, the autonomous flow control devices 30 may be used to decrease flow resistance to the fluid flow of a non-Newtonian fluid as the apparent viscosity of the non-Newtonian fluid increases, and/or alternatively, may be used to increase flow resistance to the fluid flow of a non-Newtonian fluid as the apparent viscosity of the non-Newtonian fluid decreases.

In such an example with a non-Newtonian fluid and with the properties of the formation discussed above in the previous examples, about 55% of the non-Newtonian fluid may expect to flow out through the upstream autonomous flow control device 30A, and the remaining 45% of the non-Newtonian fluid may expect to flow out through the downstream autonomous flow control device 30B. In particular, the upstream autonomous flow control device 30A may decrease the flow rate for the non-Newtonian fluid as the viscosity decreases towards the heel 12, and the downstream autonomous flow control device 30B may increase the flow rate for the non-Newtonian fluid as viscosity increases towards the toe 13. Accordingly, if a flow rate of 10 gal/min (37.9 lit/min) of non-Newtonian fluid is pumped into the tubular string 65, a flow rate of about 5.5 gal/min (20.8 lit/min) of non-Newtonian fluid may expect to flow through the upstream autonomous flow control device 30A, and a flow rate of about 4.5 gal/min (17.0 lit/min) of non-Newtonian fluid may expect to flow through the downstream autonomous flow control device 30B. In such an embodiment, the autonomous flow control devices 30 are shown as having a more balanced 11:9 ratio for controlling the flow rate of a non-Newtonian fluid, even as compared to the 3:2 balanced ratio for controlling the flow rate of a Newtonian fluid. This ratio is more ideal for the non- Newtonian fluid, as it is closer to a 1:1 ratio for completely balanced fluid flow control out of the tubular string 65. The use of the autonomous flow control devices 30 may reduce the overall amount and time of shear stress induced across the non-Newtonian fluid. This may induce less damage to the non-Newtonian fluid, particularly for a fluid with non-shear recovery.

The following examples illustrate an autonomous flow control device 30 according to certain embodiments. The following examples are not the only examples that could be given and are not intended to limit the scope of the present disclosure.

Figure 4A:
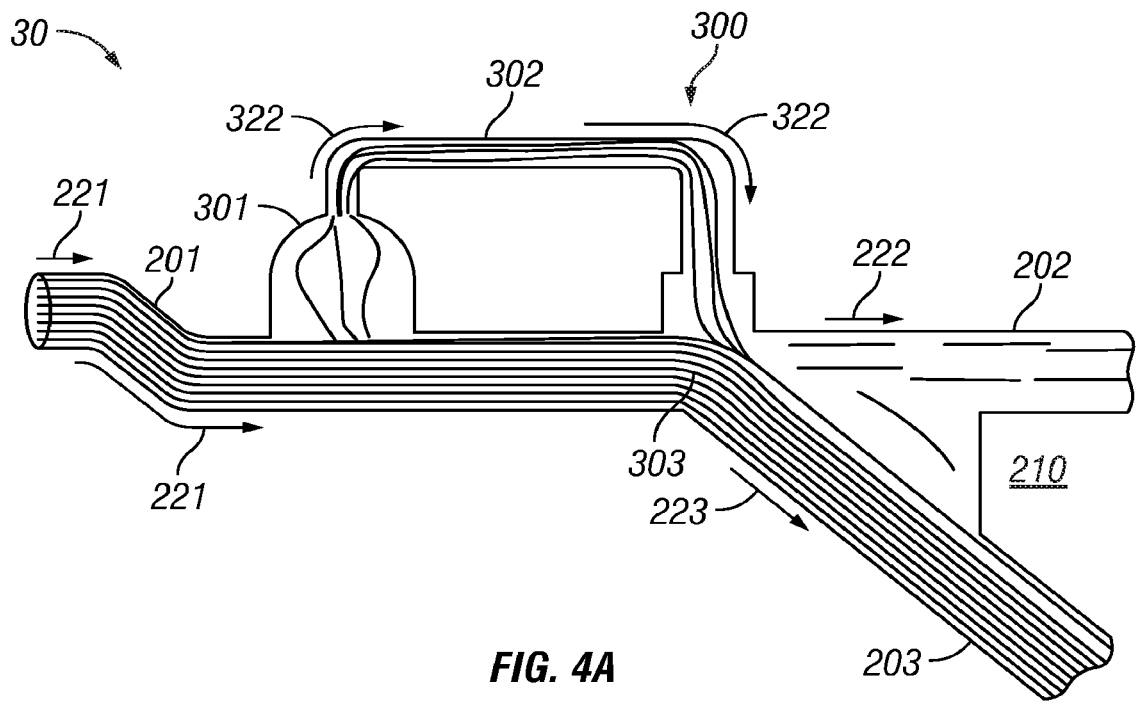
FIGS. 4A, 4B, and 5 show schematic views of an autonomous flow control device in accordance with the present disclosure.
Figure 4B:
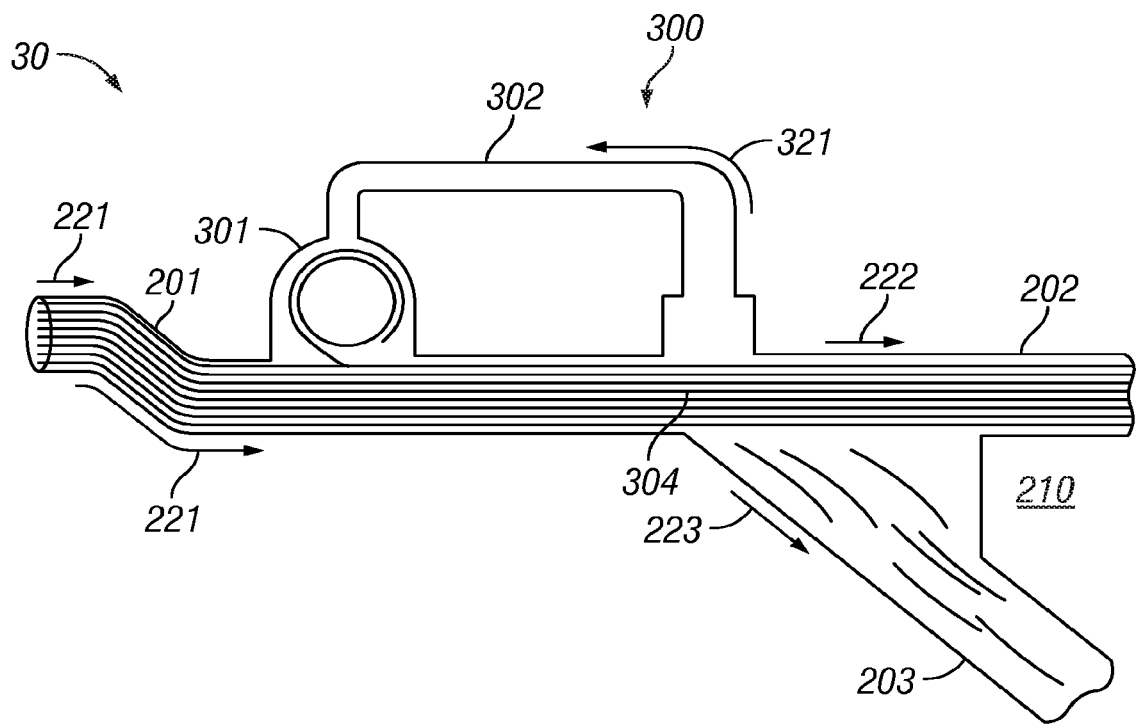
Figure 5:
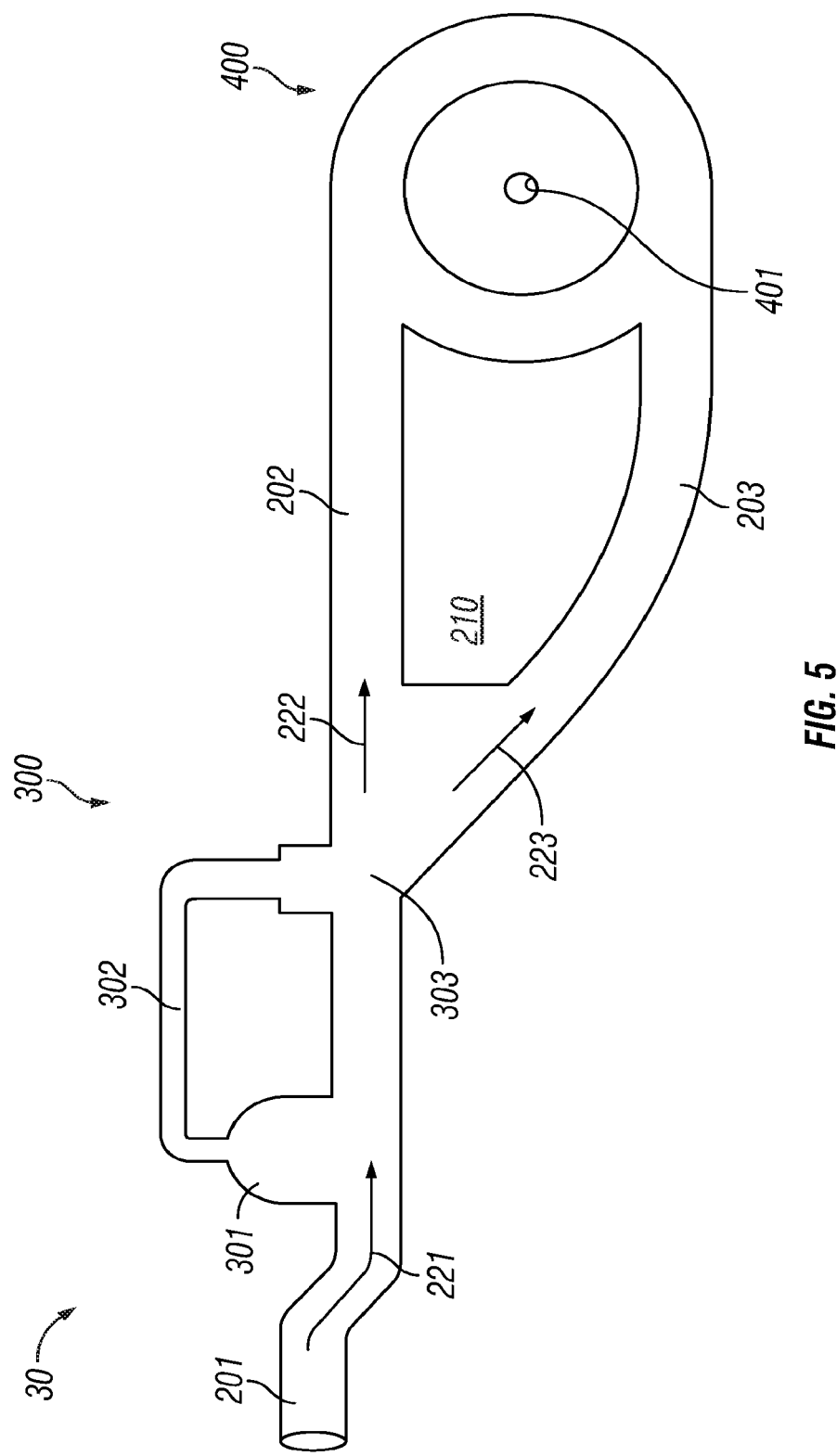

FIGS. 4A, 4B, and 5 depict an autonomous flow control device 30 according to an embodiment of the present disclosure. The autonomous flow control device 30 includes a first fluid passageway 201, a fluid direction device 300, and an exit assembly 400. The autonomous flow control device 30 may further include a second fluid passageway 202, a third fluid passageway 203, and a fluid diverter 210. According to an embodiment, the first fluid passageway 201 branches into the second and third fluid passageways 202 and 203 at the fluid diverter 210. Although some of the embodiments depict the second and third fluid passageways 202 and 203 connected to the first fluid passageway 201, it is to be understood that the second and third fluid passageways can be connected to other passageways instead. Any of the fluid passageways can be any shape including, tubular, rectangular, pyramidal, or curlicue in shape. Although illustrated as a single passageway, the first fluid passageway 201 (and any other passageway) could feature multiple passageways operatively connected in parallel.

The fluid direction device 300 may include a fluid selector 301, a fluid passageway 302, and a fluid switch 303. According to an embodiment, as at least one of the properties of a non-Newtonian fluid changes, the amount of the fluid that flows into the fluid selector 301 may also change. The property of the non-Newtonian can change with the flow rate, such as the shear-thinning behavior of the viscosity of the fluid. The change can be that the fluid increasingly or decreasingly flows into the fluid selector 301.

The non-Newtonian fluid enters the autonomous flow control device 30 and flows through the first fluid passageway 201 in the direction of 221. The non-Newtonian fluid traveling in the direction of 221 will have a specific flow rate and viscosity, but the flow rate and/or viscosity of the non-Newtonian fluid can change. According to an embodiment, the fluid selector 301 is designed such that as a property of the fluid changes, the non-Newtonian fluid can increasingly flow into the fluid selector 301. For example, as the flow rate of the non-Newtonian fluid decreases or as the viscosity of the non-Newtonian fluid increases, then the non-Newtonian fluid increasingly flows into the fluid selector 301. Regardless of the dependent property of the fluid (e.g., the flow rate of the fluid or the viscosity of the fluid), as the non-Newtonian fluid increasingly flows into the fluid selector 301, the fluid increasingly flows in the direction of 322. FIG. 4A illustrates fluid flow through the autonomous flow control device 30 when the flow rate of the fluid in the first fluid passageway 201 is low or decreases, or when the viscosity of the fluid is higher or increases. The fluid flowing in the direction of 322 can flow into the third fluid passageway 203.

According to another embodiment, as the flow rate of the non-Newtonian fluid in the first fluid passageway 201 increases or as the viscosity of the fluid decreases, then the non-Newtonian fluid decreasingly flows into the fluid selector 301. As the non-Newtonian fluid decreasingly flows into the fluid selector 301, the fluid increasingly flows in the direction of 321. FIG. 4B illustrates fluid flow through the system when the flow rate of the non-Newtonian fluid in the first fluid passageway 201 increases or when the viscosity of the non-Newtonian fluid decreases. The fluid flowing in the direction of 321 can flow into the second fluid passageway 202.

The fluid direction device 300 directs the non-Newtonian fluid into at least the second fluid passageway 202, the third fluid passageway 203, and combinations thereof. The fluid direction device 300 includes a fluid switch 303. The fluid switch 303 may direct the non-Newtonian fluid into the exit assembly 400 in the direction of 222, 223, and combinations thereof. The fluid switch 303 can be any type of fluid switch that is capable of directing a non-Newtonian fluid from one fluid passageway into two or more different fluid passageways or directing the fluid into the exit assembly 400 in two or more different directions. Examples of suitable fluid switches include, but are not limited to, a pressure switch, a mechanical switch, an electro-mechanical switch, an electro-ceramic switch, a momentum switch, a fluidic switch, a bistable amplifier, and a proportional amplifier. FIGS. 4A-5 depict an example of a pressure switch. FIG. 6 is an example of a momentum switch.

The fluid switch 303 is used to direct a non-Newtonian fluid into two or more different fluid passageways or into the exit assembly 400 in two or more different directions. In certain embodiments, the fluid switch 303 directs the non-Newtonian fluid, such as based on at least one of the physical properties of the non-Newtonian fluid. In other embodiments, the fluid switch 303 directs the non-Newtonian fluid based on an input from an external source. For example, a downhole electronic system or an operator can cause the fluid switch 300 to direct the non-Newtonian fluid. The fluid switch 303 may direct an increasing amount of the non-Newtonian fluid into the second fluid passageway 202 when the flow rate of the fluid in the first fluid passageway 201 increases and may direct an increasing amount of the non-Newtonian fluid into the third fluid passageway 203 when the flow rate of the fluid in the first fluid passageway 201 decreases. By way of another example, the fluid switch 303 may direct an increasing amount of the non-Newtonian fluid into the exit assembly 400 in the direction of 222 when the flow rate of the non-Newtonian fluid in the first fluid passageway 201 increases and may direct an increasing amount of the fluid into the exit assembly in the direction of 223 when the flow rate of the non-Newtonian fluid in the first fluid passageway 201 decreases.

Figure 6A:
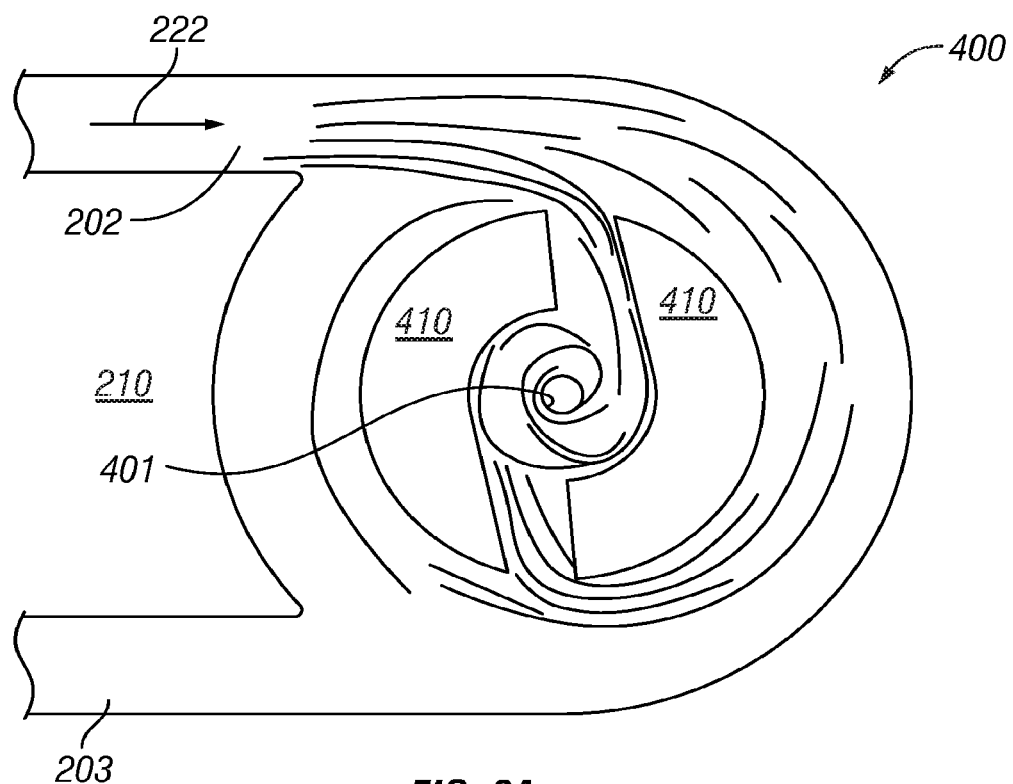
FIGS. 6A and 6B show schematic views of an autonomous flow control device in accordance with the present disclosure.
Figure 6B:
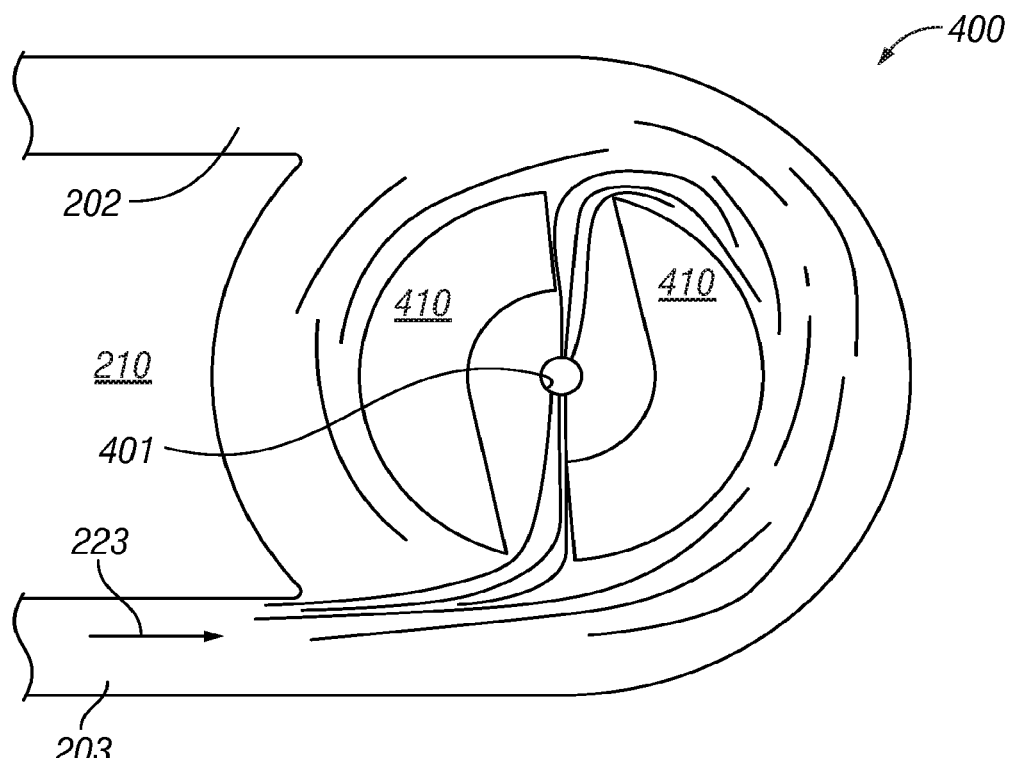
Figure 7:
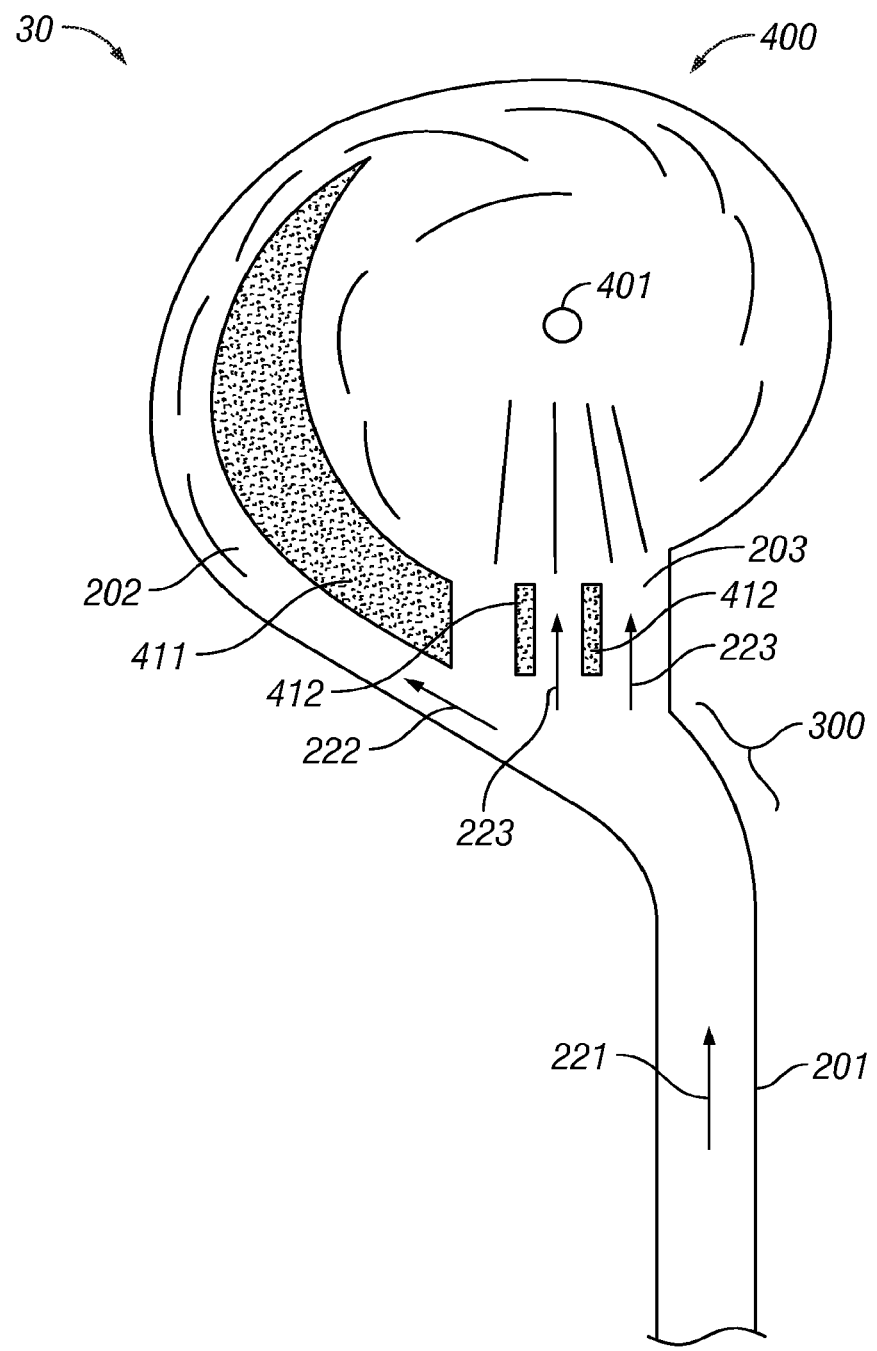
FIG. 7 shows a schematic view of an autonomous flow control device in accordance with the present disclosure.

FIGS. 6A, 6B, and 7 depict the exit assembly 400 according to one or more embodiments of the present disclosure. The exit assembly 400 includes a fluid outlet 401, in which the direction of 223 may be a direction that is radial to the fluid outlet 401. In this manner, the non-Newtonian fluid, when entering the exit assembly 400 in the direction of 223 will flow through the exit assembly 400 in a relatively non-rotational direction. As can also be seen, the direction of 222 may be a direction that is tangential relative to a radius of the fluid outlet 401. In this manner, the non-Newtonian fluid, when entering the exit assembly 400 in the direction of 222 can flow rotationally about the inside of the exit assembly 400.

According to an embodiment, the non-Newtonian fluid flowing in the direction of 223 will axially flow towards the fluid outlet 401. In this manner, the non-Newtonian fluid may exit the exit assembly 400 via the fluid outlet 401. As the non-Newtonian fluid increasingly flows through the exit assembly 400 in a direction axial to the fluid outlet 401, the resistance to fluid flow through the exit assembly 400 and the fluid outlet 401 may decrease. As the volume of non-Newtonian fluid flowing in the axial direction increases, the pressure differential between a fluid inlet of the first fluid passageway 201 (not labeled) and the fluid outlet 401 may decrease.

Further, the non-Newtonian fluid may flow in the direction of 222 rotationally about the fluid outlet 401. As the non-Newtonian fluid increasingly flows rotationally about the exit assembly 400, the resistance to fluid flow through the exit assembly 400 and the fluid outlet 401 increases. As the volume of non-Newtonian fluid flowing in the rotational direction increases, the pressure differential between a fluid inlet (not labeled) of the first fluid passageway 201 and the fluid outlet 401 increases. Further, as the pressure differential increases, the flow rate of the non-Newtonian fluid exiting the fluid outlet 401 is maintained within a flow rate range.

As depicted in FIGS. 6A and 6B, the exit assembly 400 may include at least one or more fluid directors 410. As depicted, the fluid director 410 induces flow of the non-Newtonian fluid rotationally about the exit assembly 400 and also impedes flow of the non-Newtonian fluid rotationally about the exit assembly 400. The fluid director 410 induces flow of the non-Newtonian fluid rotationally about the exit assembly 400 when the fluid enters via the second fluid passageway 202 or in the direction of 222; and impedes flow of the non-Newtonian fluid rotationally about the exit assembly 400 when the fluid enters via the third fluid passageway 203 or in the direction of 223. According to another embodiment, the size and shape of the fluid director 410 is selected such that the fluid director: induces flow of a non-Newtonian fluid rotationally about the exit assembly 400 when the fluid enters via the second fluid passageway 202 or in the direction of 222; and impedes flow of the non-Newtonian fluid rotationally about the exit assembly 400 when the fluid enters via the third fluid passageway 203 or in the direction of 223.

If at least two fluid directors 410 are used, the fluid directors 410 do not have to be the same size or the same shape. The shape of the fluid director 410 can be any shape that induces and impedes rotational flow of a non-Newtonian fluid. It is to be understood that the shapes depicted in the drawings are not the only shapes that are capable of achieving the desired result of inducing and impeding rotational flow of a non-Newtonian fluid. Moreover, multiple shapes can be used within a given exit assembly 400.

According to another embodiment and as can be seen in FIG. 7, the exit assembly 400 may include a first fluid director 411 and a second fluid director 412. The first fluid director 411 may induce rotational flow about the exit assembly 400 and the second fluid director 412 may impede rotational flow about the exit assembly 400. Further, more than one first fluid director 411 and/or second fluid director 412 may be included within the exit assembly 400.

Figure 8:
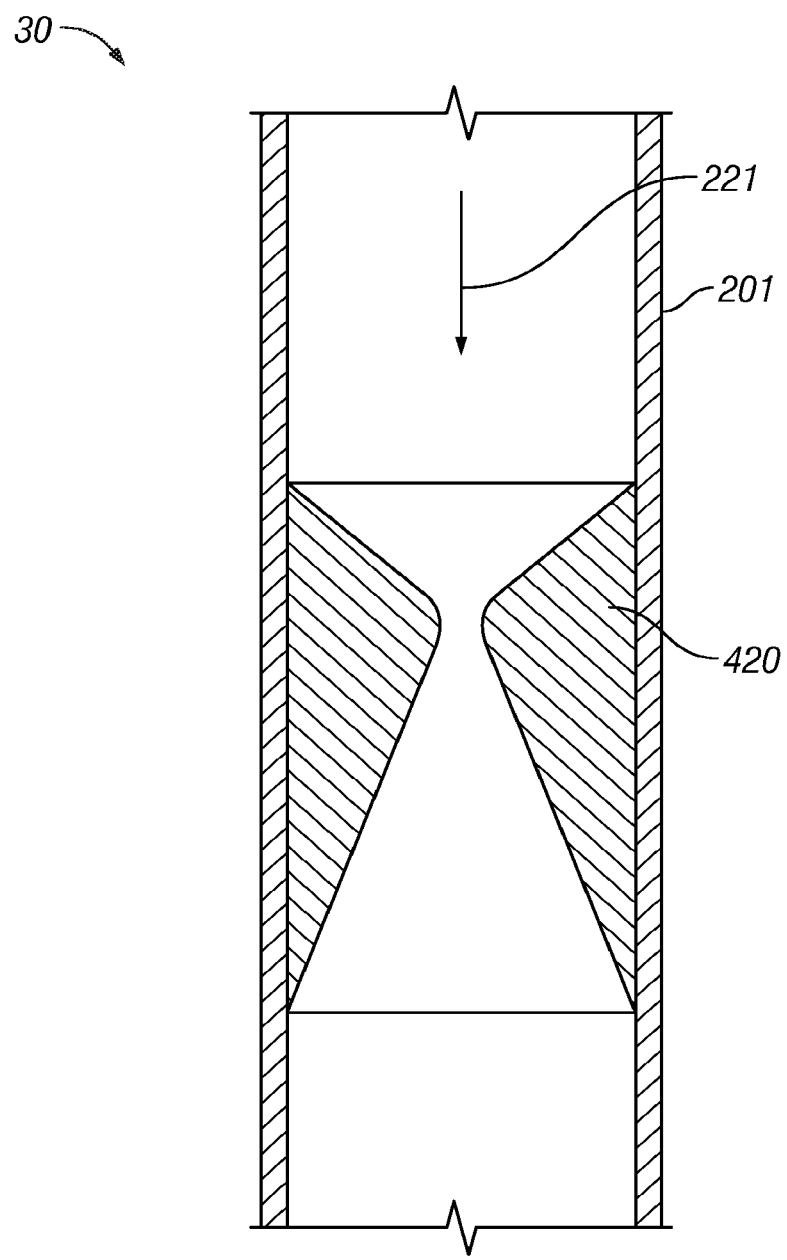
FIG. 8 shows a schematic view of an autonomous flow control device in accordance with the present disclosure.

FIG. 8 depicts an autonomous flow control device 30 according to yet another embodiment. The autonomous flow control device 30 may include the first fluid passageway 201 and a constriction 420. The constriction 420 may be a plate that is capable of moving closer to and farther away from a fluid port, such as a fluid further downstream of the constriction 420. The plate may be movable autonomously such that the plate has a biasing force (such as from a spring or other biasing mechanism) that applies the force through the plate and against the fluid flow through the constriction 420. In this manner, as the flow rate of the non-Newtonian fluid increases or the viscosity of the non-Newtonian fluid decreases, the plate may move closer to the port, thus maintaining the flow rate of the fluid exiting the restrictor within the flow rate range. The cross-sectional area of the constriction 420 is less than the cross-sectional area of the first fluid passageway 201. A pressure differential is created via the constriction 420 within the first fluid passageway 201. A first pressure exists at a location upstream of the constriction 420 and a second pressure exists at a location adjacent to the constriction 420. The pressure differential can be calculated by subtracting the second pressure from the first pressure. There can also be a first fluid flow rate at a location upstream of the constriction 420 and a second fluid flow rate at a location adjacent to the constriction 420. According to the Venturi effect, the second flow rate of the fluid increases as the cross-sectional area of the fluid passageway decreases at the constriction 420. As the second flow rate increases, the second pressure decreases, resulting in an increase in the pressure differential.

The autonomous flow control device 30 according to the embodiment depicted in FIG. 8 may maintain the flow rate of the non-Newtonian fluid exiting the first fluid passageway 201 by choking the flow of the fluid. At initially subsonic upstream conditions, the conservation of mass principle requires the fluid flow rate to increase as the non-Newtonian fluid flows through the smaller cross-sectional area of the constriction. At the same time, the Venturi effect causes the second pressure to decrease at the constriction. For liquids, choked flow occurs when the Venturi effect acting on the non-Newtonian fluid flow through the constriction decreases the liquid pressure to below that of the liquid vapor pressure at the temperature of the liquid. At that point, the liquid will partially flash into bubbles of vapor. As a result, the formation of vapor bubbles in the liquid at the constriction limits the flow rate from increasing any further. The cross-sectional area of the constriction 420 may be adjusted, such as beforehand, to maintain the flow rate of the fluid within the flow rate range. However, depending on the cross-sectional area of the constriction 420, a fluid containing undissolved solids, such as proppant, may encounter difficulty flowing through the constriction 420. Therefore, the type of autonomous flow control device 30 selected, such as for use within the embodiment depicted in FIG. 3, may depend on the type of non-Newtonian fluid being used for the stimulation.

As discussed above, the present disclosure relates to pumping a non-Newtonian fluid into a tubular string and controlling a flow rate of the non-Newtonian fluid flowing from an interior of the tubular string to an exterior of the tubular string with one or more autonomous flow control devices. Once pumped exterior to the tubular string, the non-Newtonian fluid may serve a variety of functions, such as injection into a subterranean formation. The controlling of the flow rate of the non-Newtonian fluid may include: adjusting the flow rate of the non-Newtonian fluid through the autonomous flow control device based upon a viscosity of the non-Newtonian fluid at the autonomous flow control device; and/or balancing the flow rate of the non-Newtonian fluid through the plurality of autonomous flow control devices to reduce a difference in flow rates through the plurality of autonomous flow control devices. For example, the controlling of the flow rate of the non-Newtonian fluid may include: increasing the flow rate through one of the autonomous flow control devices for a portion of the non-Newtonian fluid comprising a higher viscosity; and/or decreasing the flow rate through another of the autonomous flow control devices for a portion of the non-Newtonian fluid comprising a lower viscosity relative to the higher viscosity. Additionally or alternatively, the controlling of the flow rate of the non-Newtonian fluid may include: increasing the flow rate through one of the autonomous flow control devices positioned closer to a heel of the tubular string; and/or decreasing the flow rate through another of the autonomous flow control devices positioned closer to a toe of the tubular string relative to the heel. Further, the controlling of the flow rate of the non-Newtonian fluid may include controlling a flow resistance to the non-Newtonian fluid flowing from the interior of the tubular string to an exterior of the tubular string with the autonomous flow control device. By controlling the flow rate and the ratio of the flow rate of the non-Newtonian fluid, autonomous flow control devices may be able to proportionately distribute fluid into a well without having to manually intervene or overcorrect. For example, more non-Newtonian fluid may be supplied to a toe of a wellbore than previously provided under the same flow conditions from the surface to have a more proportionate distribution of non-Newtonian fluid within the wellbore.

In addition to the embodiments described above, many examples of specific combinations are within the scope of the disclosure, some of which are detailed below:

Embodiment 1. A method of injecting a non-Newtonian fluid into a well formed within a subterranean formation, the method comprising:
  pumping the non-Newtonian fluid into an interior of a tubular string positioned within the well;
  autonomously controlling a flow rate of the non-Newtonian fluid flowing from the interior of the tubular string to an exterior of the tubular string with an autonomous flow control device; and
  injecting the non-Newtonian fluid into the subterranean formation.

Embodiment 2. The method of Embodiment 1, wherein autonomously controlling the flow rate of the non-Newtonian fluid comprises automatically adjusting the flow rate of the non-Newtonian fluid through the autonomous flow control device based upon a viscosity of the non-Newtonian fluid at the autonomous flow control device.

Embodiment 3. The method of Embodiment 1, wherein autonomously controlling the flow rate of the non-Newtonian fluid comprises autonomously controlling the flow rate of the non-Newtonian fluid flowing from the interior of the tubular string to the exterior of the tubular string with a plurality of autonomous flow control devices.

Embodiment 4. The method of Embodiment 3, wherein autonomously controlling the flow rate of the non-Newtonian fluid comprises balancing the flow rate of the non-Newtonian fluid through the plurality of autonomous flow control devices to reduce a difference in flow rates through the plurality of autonomous flow control devices.

Embodiment 5. The method of Embodiment 3, wherein autonomously controlling the flow rate of the non-Newtonian fluid comprises at least one of:
  increasing the flow rate through one of the autonomous flow control devices for a portion of the non-Newtonian fluid comprising a higher viscosity; and
  decreasing the flow rate through another of the autonomous flow control devices for a portion of the non-Newtonian fluid comprising a lower viscosity relative to the higher viscosity.

Embodiment 6. The method of Embodiment 3, wherein autonomously controlling the flow rate of the non-Newtonian fluid comprises at least one of:
  decreasing the flow rate through one of the autonomous flow control devices positioned closer to a heel of the tubular string; and
  increasing the flow rate through another of the autonomous flow control devices positioned closer to a toe of the tubular string relative to the heel.

Embodiment 7. The method of Embodiment 1, wherein the controlling the flow rate of the non-Newtonian fluid comprises controlling a flow resistance to the non-Newtonian fluid flowing from the interior of the tubular string to an exterior of the tubular string with the autonomous flow control device.

Embodiment 8. The method of Embodiment 1, wherein the autonomous flow control device is positioned within a wall of the tubular string.

Embodiment 9. The method of Embodiment 1, wherein the autonomous flow control device comprises one of a fluidic diode autonomous flow control device, a movable plate autonomous flow control device, a differential pressure autonomous flow control device, and a labyrinth-shaped autonomous flow control device.

Embodiment 10. The method of Embodiment 1, wherein the non-Newtonian fluid comprises a synthetic polymer comprising polyacrylamide.

Embodiment 11. The method of Embodiment 1, wherein the non-Newtonian fluid comprises an injection gel, an acid gel, a gravel pack gel, and a sealing gel.

Embodiment 12. The method of Embodiment 1, wherein a viscosity of the non-Newtonian fluid decreases as a flow rate for the non-Newtonian fluid increases.

Embodiment 13. A method of pumping a non-Newtonian fluid, the method comprising:
  pumping the non-Newtonian fluid into an interior of a tubular string; and
  autonomously controlling a flow resistance to the non-Newtonian fluid flowing from the interior of the tubular string to an exterior of the tubular string with an autonomous flow control device.

Embodiment 14. The method of Embodiment 13, wherein the tubular string is positioned within a well formed within a subterranean formation.

Embodiment 15. The method of Embodiment 14, the method further comprising injecting the non-Newtonian fluid into the subterranean formation.

Embodiment 16. The method of Embodiment 14, wherein autonomously controlling the flow rate of the non-Newtonian fluid comprises at least one of:
  decreasing the flow rate through one of the autonomous flow control devices positioned closer to a heel of the tubular string; and
  increasing the flow rate through another of the autonomous flow control devices positioned closer to a toe of the tubular string relative to the heel.

Embodiment 17. The method of Embodiment 13, wherein autonomously controlling the flow rate of the non-Newtonian fluid comprises automatically adjusting the flow rate of the non-Newtonian fluid through the autonomous flow control device based upon a viscosity of the non-Newtonian fluid at the autonomous flow control device.

Embodiment 18. The method of Embodiment 13, wherein autonomously controlling the flow rate of the non-Newtonian fluid comprises autonomously controlling the flow rate of the non-Newtonian fluid flowing from the interior of the tubular string to the exterior of the tubular string with a plurality of autonomous flow control devices.

Embodiment 19. The method of Embodiment 18, wherein autonomously controlling the flow rate of the non-Newtonian fluid comprises at least one of:

increasing the flow rate through one of the autonomous flow control devices for a portion of the non-Newtonian fluid comprising a higher viscosity; and decreasing the flow rate through another of the autonomous flow control devices for a portion of the non-Newtonian fluid comprising a lower viscosity relative to the higher viscosity.

Embodiment 20. The method of Embodiment 13, wherein the non-Newtonian fluid comprises a synthetic polymer comprising polyacrylamide.

One or more specific embodiments of the present disclosure have been described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

In the following discussion and in the claims, the articles "a," "an," and "the" are intended to mean that there are one or more of the elements. The terms "including," "comprising," and "having" and variations thereof are used in an open-ended fashion, and thus should be interpreted to mean "including, but not limited to . . . " Also, any use of any form of the terms "connect," "engage," "couple," "attach," "mate," "mount," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" generally mean perpendicular to the central axis. The use of "top," "bottom," "above," "below," "upper," "lower," "up," "down," "vertical," "horizontal," and variations of these terms is made for convenience, but does not require any particular orientation of the components.

Certain terms are used throughout the description and claims to refer to particular features or components. As one skilled in the art will appreciate, different persons may refer to the same feature or component by different names. This document does not intend to distinguish between components or features that differ in name but not function.

Reference throughout this specification to "one embodiment," "an embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A method of injecting a non-Newtonian shear thinning gel into a well formed within a subterranean formation, the method comprising:
   pumping the non-Newtonian shear thinning gel into an interior of a tubular string positioned within the well;
   autonomously controlling flow rates of the non-Newtonian shear thinning gel flowing from the interior of the tubular string along the tubular string to an exterior of the tubular string along the tubular string with autonomous flow control devices arranged axially along a length of the tubular string that increase flow resistance as apparent viscosity of the non-Newtonian shear thinning gel at the autonomous flow control devices decreases to balance the flow rate of the non-Newtonian shear thinning gel through the autonomous flow control devices simultaneously and reduce a difference in flow rates through the autonomous flow control devices by decreasing the flow rate through autonomous flow control devices positioned closer to a heel of the tubular string and increasing the flow rate through autonomous flow control devices positioned closer to a toe of the tubular string relative to the heel; and
   injecting the non-Newtonian shear thinning gel into the subterranean formation from the well from the autonomous flow control devices.

2. The method of claim 1, wherein autonomously controlling the flow rate of the non-Newtonian shear thinning gel further comprises at least one of:
   increasing the flow rate through one of the autonomous flow control devices for a portion of the non-Newtonian shear thinning gel comprising a higher viscosity; or
   decreasing the flow rate through another of the autonomous flow control devices for a portion of the non-Newtonian shear thinning gel comprising a lower viscosity relative to the higher viscosity.

3. The method of claim 1, wherein the autonomous flow control device is positioned within a wall of the tubular string.

4. The method of claim 1, wherein the autonomous flow control devices comprise at least one of a fluidic diode autonomous flow control device, a movable plate autonomous flow control device, a differential pressure autonomous flow control device, or a labyrinth-shaped autonomous flow control device.

5. The method of claim 1, wherein the non-Newtonian shear thinning gel comprises a synthetic polymer comprising polyacrylamide.

6. The method of claim 1, wherein the non-Newtonian shear thinning gel comprises at least one of an injection gel, an acid gel, a gravel pack gel, or a sealing gel.

7. A method of pumping a non-Newtonian shear thinning gel, the method comprising:
   pumping the non-Newtonian shear thinning gel into an interior of a tubular string; and
   autonomously controlling flow resistances to the non-Newtonian shear thinning gel flowing from the interior of the tubular string to an exterior of the tubular string with autonomous flow control devices that increase flow resistance as apparent viscosity of the non-Newtonian shear thinning gel decreases to simultaneously balance the flow rate of the non-Newtonian shear thinning gel through the autonomous flow control devices and reduce a difference in flow rates through the autonomous flow control devices by decreasing the flow rate through the autonomous flow control devices positioned closer to a heel of the tubular string and increasing the flow rate through another of the autonomous flow control devices positioned closer to a toe of the tubular string relative to the heel.

8. The method of claim 7, wherein the tubular string is positioned within a well formed within a subterranean formation.

9. The method of claim 8, the method further comprising injecting the non-Newtonian shear thinning gel into the subterranean formation.

10. The method of claim 7, wherein autonomously controlling the flow rate of the non-Newtonian shear thinning gel comprises automatically adjusting the flow rate of the non-Newtonian shear thinning gel through one of the autonomous flow control devices based upon a viscosity of the non-Newtonian shear thinning gel at the autonomous flow control device.

11. The method of claim 7, wherein autonomously controlling the flow rate of the non-Newtonian shear thinning gel comprises at least one of:
increasing the flow rate through one of the autonomous flow control devices for a portion of the non-Newtonian shear thinning gel comprising a higher viscosity; or
decreasing the flow rate through another of the autonomous flow control devices for a portion of the non-Newtonian shear thinning gel comprising a lower viscosity relative to the higher viscosity.

12. The method of claim 7, wherein the non-Newtonian shear thinning gel comprises a synthetic polymer comprising polyacrylamide.

* * * * *